United States Patent [19]

Cundy et al.

[11] 4,417,911
[45] Nov. 29, 1983

[54] MANUFACTURE OF OPTICAL FIBRE PREFORMS

[75] Inventors: Steven L. Cundy, Stanmore; Ronald A. Evans, London; Oliver S. Johnson, Northfleet; John S. McCormack, Wembley; Bruce A. Nichols, London, all of England

[73] Assignee: Associated Electrical Industries Limited, London, England

[21] Appl. No.: 351,483

[22] Filed: Feb. 23, 1982

[30] Foreign Application Priority Data

Feb. 27, 1981 [GB] United Kingdom ................. 8106311

[51] Int. Cl.³ ................. C03B 19/00; C03B 37/025
[52] U.S. Cl. ................. 65/3.12; 427/39; 427/45.1; 427/163; 427/237
[58] Field of Search ................. 65/3.12, 3.2, 18.2; 427/39, 45.1, 53.1, 163, 166, 167, 237

[56] References Cited

U.S. PATENT DOCUMENTS

| | | | |
|---|---|---|---|
| 3,957,474 | 5/1976 | Kobayashi et al. | 65/3.12 |
| 4,117,802 | 10/1978 | Le Sergent et al. | 65/3.12 X |
| 4,125,389 | 11/1978 | King | 65/3.12 |
| 4,233,045 | 11/1980 | Sarkar | 65/3.12 |
| 4,253,863 | 3/1981 | Iyengar | 65/3.12 X |
| 4,310,340 | 1/1982 | Sarkar | 65/3.12 |

FOREIGN PATENT DOCUMENTS 52-43442 4/1977 Japan ................. 65/3.12

Primary Examiner—Richard V. Fisher
Attorney, Agent, or Firm—Kirschstein, Kirschstein, Ottinger & Cobrin

[57] ABSTRACT

In the manufacture of a glass optical fibre preform by forming a coating of oxide material on the interior surface of a substrate tube, in particular a coating of silica and one or more dopant oxides on a vitreous silica tube, by causing a reaction to take place between oxygen and the vapor or vapors of one or more compounds such as halides, the reactant vapors are introduced into a perforated tube supported coaxially within the heated substrate tube and pass through the perforations into the annular space between the perforated and substrate tubes, while oxygen, and optionally an additional carrier gas, is passed either into the perforated tube or directly into said space. The coating-forming reaction is caused to take place in said space by generating energy in the space, in the form of a plasma, or a laser beam, and/or heat, and/or gas combustion, whereby the coating is formed simultaneously on the whole heated length of the substrate tube.

6 Claims, 1 Drawing Figure

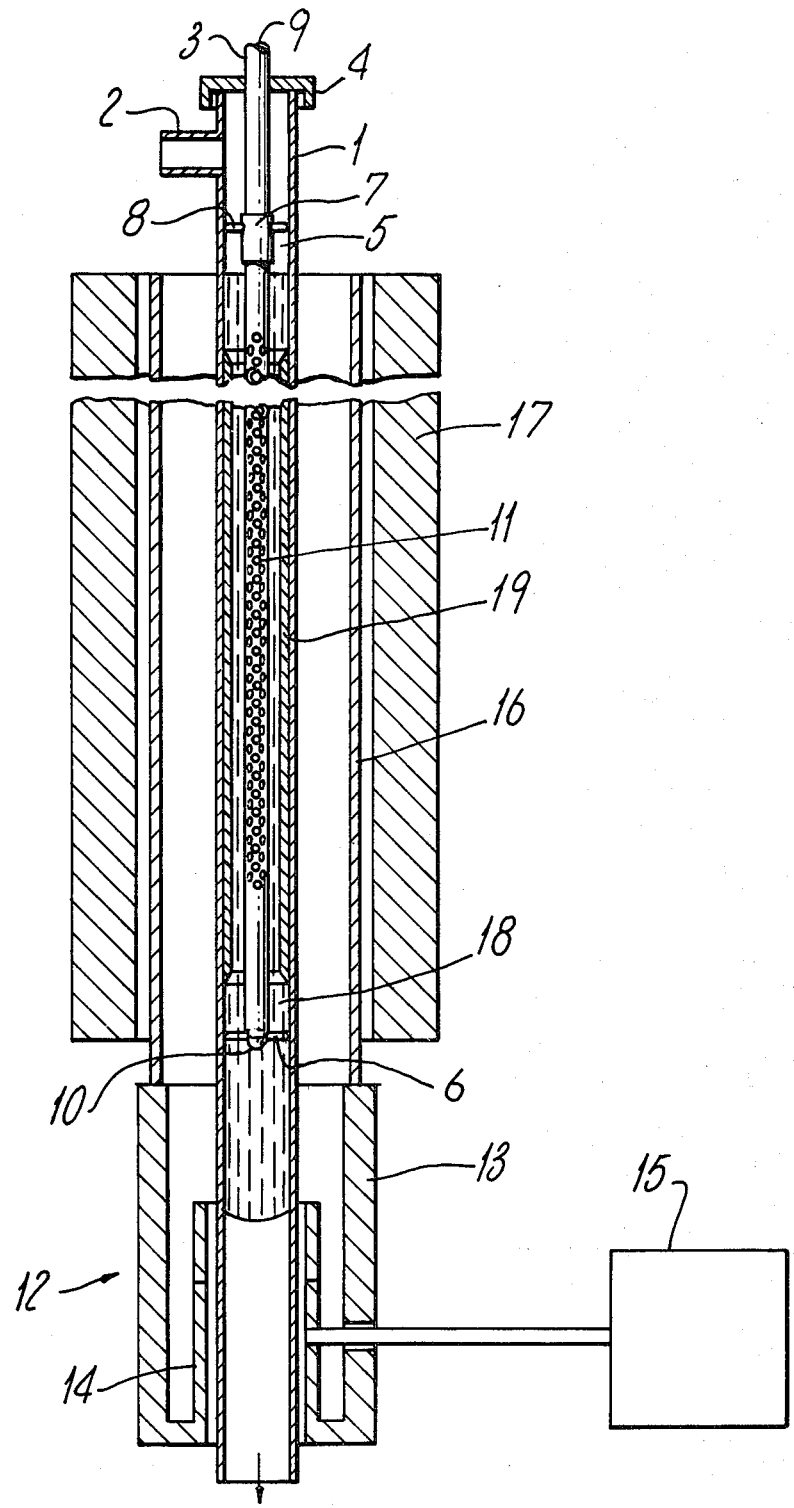

MANUFACTURE OF OPTICAL FIBRE PREFORMS

This invention relates to the manufacture of glass preforms, from which optical fibre waveguides can be produced by drawing, by a method of the type (hereinafter referred to as the type specified) in which a chemical reaction is caused to take place between oxygen and the vapour or vapours of one or more compounds such as halides, which reaction results in the formation of a coating composed essentially of one or more oxides on the interior surface of a glass tube. The invention also relates to apparatus for use in carrying out the method described.

Methods which have been proposed for promoting a said chemical reaction include the application of heat, and the production of a plasma in the gaseous mixture. Thus for effecting deposition of a coating on the interior surface of a substrate tube, a heat source may be traversed along the exterior of the tube while the gaseous mixture flows through the tube, the solid reaction product being formed as fine particles which are deposited progressively along the surface of the tube bore and converted into a glass layer by further heating, and the process being repeated as required to form a multi-layer coating. Progressive deposition along the bore of a tube can also be effected by causing relative longitudinal movement to take place between the tube and a plasma-exciting device external to the tube. In another method which has been proposed for effecting plasma activation of a said reaction in a gaseous mixture flowing through a substrate tube, the plasma-exciting device is maintained in a stationary position around a portion of the tube adjacent to the gas exit end thereof, and the electrical power input to the device is continuously and progressively varied to cause the termination of the plasma column to be swept along the tube, the column being alternately extended and contracted, and each sweep of the plasma column again resulting in progressive deposition along the tube.

It is an object of the present invention to provide an improved method of the type specified for manufacturing an optical fibre preform, by the deposition of a coating as aforesaid on the interior surface of a substrate tube.

According to the invention, in a method of manufacturing a glass optical fibre preform in which a coating composed essentially of one or more oxides is formed on the interior surface of a glass substrate tube by causing a chemical reaction to take place between oxygen and the vapour or vapours of one or more compounds capable of reacting with oxygen to produce the desired coating material, an inner tube which has a multiplicity of perforations through its wall is supported coaxially within the substrate tube, an annular space being provided between the perforated tube and the substrate tube, and a gaseous mixture consisting of oxygen and said vapour or vapours, and optionally an additional carrier gas, is caused to flow into the said annular space, at least the said vapour or vapours being introduced into the annular space by being passed into the inner tube so as to emerge through the perforations into said space, the gas pressure within the inner tube being maintained higher than that in the said annular space so as to cause gas to flow through the perforations into said space, while at least a major part of the length of the substrate tube is maintained at an elevated temperature, and a chemical reaction is caused to take place throughout the said annular space by generating energy in said space, whereby a coating of solid material resulting from the said reaction is formed simultaneously on the whole of the interior surface of the heated length of the substrate tube, while residual gases and gaseous reaction products are withdrawn from said annular space.

The substrate tube is usually of circular cross-section, in accordance with the normal practice in the manufacture of optical fibre preforms. The inner, perforated tube is also usually of circular cross-section.

A pressure differential must be maintained between the interior of the inner tube and the said annular space in which the reaction takes place, in order to ensure that the vapour or vapours (with or without oxygen and/or additional carrier gas) introduced into the inner tube will flow through the perforations into the said space. Preferably one end of the inner tube is closed or has a restricted outlet to enable the required pressure differential to be maintained, and to ensure that the reactant vapours leave the inner tube only through the perforations. Alternatively, it is possible to introduce the gas/vapours simultaneously into both ends of the inner tube to sustain the required pressure. The reduced pressure in the annular space is maintained by constant exhaustion of this space by suitable pumping means connected to one end of the substrate tube, through which gaseous reaction products, carrier gas and any residual gaseous reactants are removed. The pressure in the inner tube must be limited so that the flow rate of the gases into the annular reaction space is not so rapid that the required reduced pressure in said space cannot be maintained by the pumping system. If desired, the substrate tube may be exhausted from both ends, especially if gases are introduced into both ends of the inner tube.

The application of heat is required for maintaining the substrate tube at a suitable elevated temperature for promoting smooth, uniform deposition, and may also provide at least part of the energy required for promoting the gaseous reaction. The heating is conveniently effected by enclosing the substrate tube in a tubular electric furnace.

The method of the invention is particularly applicable to the manufacture of an optical fibre preform composed of silica with one or more dopants for imparting a desired refractive index profile to the fibre. In this case, the substrate tube is formed of vitreous silica, and the reactant vapours suitably consist of silicon tetrachloride and, for at least part of the process, a halide or halides from which the required dopant or dopants is or are derived. The halide vapours are entrained in streams of carrier gas which are bubbled through the liquid halides: oxygen may be employed as the carrier gas, or an additional gas, suitably argon, may be used for this purpose. The halides employed are usually chlorides, but if it is desired to introduce fluorine as a dopant in the silica coating a suitable fluorine-containing compound, such as dichlero-difluorosilane, may be included in the reaction mixture.

The substrate tube may form the cladding of an optical fibre the core of which is formed of the coating material, or the tube may constitute a support for an optical waveguide structure wholly formed by the coating material. The composition of the gas/vapour mixture introduced into the inner tube may be maintained constant throughout the deposition process, to produce a step refractive index structure, or may be varied as desired to produce a coating of graded refractive index, or a coating composed of two or more concentric regions with and without dopants, which regions may constitute, for example, cladding and/or barrier layers and the core of the fibre obtained from the preform, each such region being of either uniform or graded composition as required.

The method of the invention constitutes an essentially continuous process for building up a coating on the bore of a substrate tube, the whole of the required length of the tube being coated at the same time. Thus the operations of causing the flow of gases and vapours through the system, generating energy in the annular reaction zone, and applying heat, can be carried out continuously for any length of time required to produce a coating of a desired thickness. However, the process may be interrupted when desired, provided that on recommencement the continuity of the composition of the coating, whether uniform, graded, or stepped, is maintained by appropriate control of the composition of the gaseous reaction mixture and of the operating conditions.

The dimensions of the spaces both inside and outside the perforated tube, and the arrangement of the perforations in said tube, should be such that the coating deposited on the substrate is of uniform thickness both radially and longitudinally. The perforations may be varied in respect of number, diameter and distribution along the length of the tube as required to produce desired gas flow and deposition rates. In particular, it may be necessary to provide an increasing number of perforations towards the end of the inner tube remote from the gas input end thereof, to counteract the effect of a drop in pressure along the tube. It may also be desirable to rotate and/or reciprocate the perforated tube with respect to the substrate tube, to ensure radial and longitudinal uniformity of deposition of the coating.

The perforated tube is preferably formed of vitreous silica, through which perforations of the required sizes and distribution can be drilled; alternatively, the tube may be formed of a porous ceramic material with suitably distributed and sized pores constituting the required perforations.

If desired, some or all of the constituents of the gaseous mixture may be introduced through individual perforated tubes inserted into the main tube system, either inside or outside the aforesaid perforated tube. Such an arrangement may be advantageous when it is required to vary the rates of flow of the halide vapours in relation to one another, in the manufacture of a graded index fibre.

The energy generated in the annular space between the substrate tube and the perforated tube, for activating the coating-forming reaction, may be of a non-isothermal type, produced for example by a plasma or a laser beam, or may be isothermal energy produced by heating of the substrate externally or by gas combustion taking place in the said space. If a non-isothermal energy source is employed, the energy produced may be enhanced by the heat applied to the system.

A preferred energy source is a plasma-exciting device, operated in such a manner as to produce a plasma column in the gaseous mixture in the annular reaction zone between the substrate tube and the perforated tube, and to maintain the column throughout substantially the whole length of the said space. Preferably the device is maintained in a stationary position with respect to the assembly of substrate tube and perforated tube, but if desired it may be reciprocated longitudinally with respect to the said assembly. The device may be a RF coil surrounding the substrate tube. Alternatively, and preferably, the device may be a microwave cavity located around one end of the substrate tube, and supplied with sufficient power to produce a plasma column of the required length. It is usually necessary to employ auxiliary means, such as a Tesla coil, to initiate the plasma.

The maintenance of a pressure differential, as aforesaid, such that the gas pressure within the inner perforated tube is greater than that in the annular space between the perforated tube and the substrate tube, is necessary not only for ensuring continuous gas flow into the said space, but also to ensure that a plasma is produced only in the said space. Thus the pressure in the inner tube, which is controlled in the gas/vapour input line to said tube, is kept sufficiently high to prevent plasma formation within said tube, while the pressure in the said annular space is maintained sufficiently low to ensure that a plasma column of appropriate length is sustained in this space.

The conditions of temperature and gas flow, as well as pressure differential, are so controlled that reaction between the oxygen and reactant vapour or vapours takes place only in the annular space between the perforated tube and the substrate tube, the occurrence of any reaction within the perforated tube being prevented. Preferably only the reactant vapours, entrained in a carrier gas, for example argon, are passed into the inner perforated tube, the oxygen, with or without additional carrier gas, being passed through the space between the inner and substrate tubes, so that the said reaction can take place only on mixing of the reactant vapours with oxygen in the said space. If desired, however, the oxygen can be passed into the inner tube, and may constitute the carrier gas for the vapours: in this case the heat applied to the substrate tube must be so controlled that the temperature of the inner tube is maintained too low to cause thermally activated reaction to occur therein.

When a plasma is employed for activating the reaction, the oxygen present in the annular reaction space can provide sufficient ionisable gas to sustain the plasma, but if desired an additional ionisable gas, suitably argon, krypton or xenon, may also be passed through the annular space, whether or not such a gas is used as the carrier for the reactant vapours. The provision of such additional ionisable gas assists in sustaining the plasma as well as increasing the total carrier gas flow through the system. A relatively high rate of flow of carrier gas in relation to the rates of flow of oxygen and reactant vapours is advantageous since the higher the ratio of carrier gas flow rate to oxygen and reactant vapour flow rates, the greater is the length of plasma column attainable with a given level of power input to the plasma-exciting device. The ratio of the flow rates of oxygen to reactant vapour or vapours should, of course, be sufficiently high to ensure substantially complete conversion of the reactant compounds to the oxides: we have found, in practice, that a proportion of oxygen considerably in excess of the stoichiometric proportion is required for complete conversion.

It is usually preferred to control the conditions of temperature of the substrate tube, gas pressure in the said annular space, and relative rates of flow of the gaseous constituents into the said space, so that a vitreous reaction product is formed directly on the substrate tube wall, without preliminary formation of particulate material either on the substrate or in the gaseous reaction mixture in the said space. With plasma excitation, for example using a power supply not substantially greater than 300 watts, the gas pressure in the said space occupied by the plasma is preferably maintained below 100 Torr, and if it is desired to form a vitreous coating directly the pressure is preferably maintained below 20 Torr. However in some cases operation at higher power and higher pressure, with the formation of a particulate coating, may be desirable, since higher deposition rates are attainable under such conditions. The substrate tube is preferably maintained at a sufficiently high temperature to ensure the production of a smooth, continuous vitreous coating without causing distortion of the substrate, a suitable temperature in the case of a silica tube being about 1000° C. If a particulate coating is formed initially it is vitrified by the applied heat which in these circumstances may be required to raise the temperature of the substrate tube above 1000° C., for example to 1200°–1250° C.

Some deposition of the coating material may occur on the outer surface of the perforated tube, but to a lesser extent than on the substrate tube bore, provided that the substrate tube is maintained at a suitably high temperature, and we have found that little or no deposition occurs in the perforations, so that these do not become blocked.

One suitable form of plasma-exciting device for use in carrying out the method of the invention is a microwave cavity of the asymmetrical type, formed of two concentric cylinders, the inner cylinder being located around a portion of the substrate tube adjacent to one end of the tube. The inner cylinder is shorter than the outer cylinder, and the cavity is so designed that, in operation, a region of high electrical field strength is produced only at the inner end of the inner cylinder (that is to say the end of the inner cylinder remote from the adjacent end of the substrate tube) so that the plasma column produced extends wholly along the space in which reaction is required to take place, and not in the reverse direction.

The power input to the microwave cavity, from a microwave generator, is maintained at an approximately constant level throughout the coating process, and may be of any desired magnitude for producing a plasma column of the length required to effect deposition of the coating on a given longitudinal region of the substrate tube. Furthermore, the power level required will also depend upon the gas pressure in the space between the perforated tube and the substrate tube, and upon the relative rates of flow of the constituents of the gaseous mixture through the system, since these factors, as indicated above, affect the length of plasma column obtained with a given power input.

Preferably, in addition to a microwave cavity as aforesaid, an electrically conductive tube is positioned coaxially around the substrate tube, abutting the microwave cavity and extending along the substrate tube for a distance corresponding to the desired length of the plasma column, the arrangement being such that the combination of the conductive tube and the plasma column produced in operation constitutes a coaxial waveguide; this conductive tube may be constituted by the inner wall of a tubular furnace employed for external heating of the substrate tube, or may be a separate metal tube. In operation of this arrangement of microwave cavity and conductive tube (hereinafter referred to as a "waveguide tube"), power from the cavity is coupled to the plasma, and a progressive electromagnetic wave is launched along the waveguide from the cavity, promoting increased extension of the plasma column for a given power input to the cavity.

The dimensions of the microwave cavity are preferably such that the cavity will support an electromagnetic wave in the transverse electromagnetic (TEM) mode, and the length of the inner cylinder of the cavity is preferably adjusted so that the power reflected at the inner end of the inner cylinder sets up a standing wave pattern within the cavity, with the maximum voltage at the level of the inner end of the inner cylinder. Such a standing wave pattern is approximately equal to $(2n+1)\lambda/4$ where n is an integer and $\lambda$ is the free space wavelength of the operating frequency applied to the cavity.

Advantageously the waveguide tube has an internal diameter which is such, in relation to the internal diameter of the substrate tube (corresponding to the outer diameter of the plasma column), that the wave propagated along the waveguide is in the $H_{10}$ coaxial mode: we have found that propagation in the $H_{10}$ mode results in the production of a plasma column of maximum length, with any given conditions of power input and gas flow rates and pressure, thus giving optimum efficiency in respect of the use of power, and that propagation in this mode depends upon the relationship between the internal diameters of the substrate tube and the waveguide tube respectively. Thus, for a given substrate tube internal diameter, there is a critical minimum internal diameter of the waveguide tube which must be equalled or exceeded in order to obtain propagation in the $H_{10}$ mode along the waveguide, and hence to obtain the optimum length of plasma column. The minimum waveguide tube internal diameter required, to ensure propagation in the $H_{10}$ mode, is close to that derived from the following relationship:

$$\lambda = \pi(x+y)$$

where $\lambda$ is the free space wavelength of the operating frequency, x is the internal radius of the substrate tube, and y is the internal radius of the waveguide tube.

For ensuring optimum operation of the microwave cavity/coaxial waveguide arrangement, the total impedance of this arrangement should match that of the combination of the microwave generator and the cable connecting the generator of the cavity. The impedance of the cavity/waveguide system is affected by the internal diameter of the waveguide tube, and can be conveniently adjusted to the optimum value by altering the ratio of the diameters of the inner and outer cylinders of the cavity.

As an alternative form of energy source, which can be used instead of a plasma exciting device, a laser may be located adjacent to one end of the substrate tube, and operated in such a manner that a laser beam is directed along and within the annular space between the perforated tube and the substrate tube, so as to surround the perforated tube.

A further method of generating the energy required for promoting the coating-forming reaction, which may be employed in conjunction with, or as an alternative to, another form of energy excitation such as the production of a plasma, consists in including a combustible gas in the gaseous reaction mixture, and effecting combustion of this gas in the annular space between the substrate tube and the perforated tube. If the substrate tube is heated externally, for example to 1000° C., before the combustible gas is introduced, spontaneous ignition will take place in a gaseous mixture containing appropriate relative proportions of oxygen and combustible gas. Alternatively, the additional heating may be omitted, and ignition of the gas effected by suitable means, such as an electrode, inserted in the said annular space at one end of the tubular system, the combustion of the gas then providing sufficient heat to maintain the substrate tube at the required elevated temperature. The combustible gas used should be one whose products of combustion will not include substances which would be undesirable contaminants of the deposited coating: carbon monoxide or other non-hydrogen-containing gas or vapour is preferred. The combustible gas may be employed as the carrier gas for the reactant vapours.

The combustible gas is fed into the inner perforated tube, together with the reactant vapours and, if required, an additional carrier gas, while oxygen is passed through the annular space between the inner tube and the substrate tube, so that the combustible gas is ignited on emerging through the perforations into said space. Oxygen is preferably excluded from the gas mixture introduced into the inner tube, or if included is present in an insufficient concentration to support combustion, in order to ensure that combustion takes place only in the outer annulus, and that no back-firing into the inner tube can occur. The rate of flow of oxygen into the annulus must of course be considerably in excess of that required for reaction with the halide vapours, to provide sufficient oxygen to effect continuous combustion.

If the perforated tube tends to become overheated as a result of the gas combustion taking place around it, it may be necessary to make provision for cooling this tube to prevent distortion thereof, for example by passing cooling fluid, suitably water or nitrogen, through an additional tube disposed inside the perforated tube, the relative diameters of the cooling tube and the perforated tube being such that the flow of gases through the perforations is unimpeded. Alternatively, the perforated tube may be formed of a material having a softening temperature higher than that of silica, for example vitrified alumina or a porous ceramic as aforesaid.

For carrying out the process of the invention, using any of the methods described above for activating the reaction, the glass substrate tube is preferably disposed vertically; the inner tube is supported from the upper end of the substrate tube, the gases preferably being introduced into the upper end of the tube assembly. Alternatively the process can be carried out with the substrate tube and perforated tube disposed horizontally. In either case, but especially with the horizontal arrangement, it may be desirable to rotate the substrate tube continuously about its longitudinal axis, instead of or in addition to the rotation of the perforated tube relative to the substrate tube, referred to above, in order to avoid the possibility of non-uniformity of deposition of the coating over the whole circumference of the substrate tube bore.

The method of this invention is advantageous in that deposition of the coating is effected simultaneously over the whole of the required length of the substrate tube bore, instead of progressively along the tube as is the case with previously proposed methods of forming the coating by a reaction promoted by either heat or a plasma. The formation of a coating of a desired thickness is thus achieved much more rapidly than in the said previous methods. Furthermore, since the coating is built up continuously, and is not formed in a plurality of discrete layers, a continuous gradation of the composition of the coating can be obtained. Thus, for the production of an optical fibre having a graded refractive index, the dopant precursor content of the gaseous reaction mixture is increased continuously, rather than incrementally, to give a continuous gradation of the dopant content of the deposited coating, resulting in a fibre having a smooth refractive index profile.

The method also allows large diameter preforms to be easily produced without damage or strain, especially in a static arrangement in which the substrate tube is not rotated. In addition the use of plasma excitation combined with controlled gas flow distribution allows the deposition to be carried out at lower temperatures without the production of undesirable local variations in deposition quality and quantity, this again favouring the production of large preforms. The larger preforms which can be obtained by this process enable long continuous lengths of optical fibre to be produced at lower cost per unit length than is possible with smaller preforms.

The plasma can be controlled by power input, frequency, and variable tuning of the plasma-exciting device, to modify or focus the plasma configuration in any desired manner for producing controlled deposition and an improved preform. The precision of the control provided by the plasma technique, suitably modified by electromagnetic field control, combined with pressure and flow control of the gaseous reaction mixture, enables the system to be operated automatically to produce preforms of improved consistency of composition and dimensions.

A specific method in accordance with the invention, for the manufacture of an optical fibre preform composed of a doped silica core and silica cladding, will now be described by way of example with reference to the accompanying diagrammatic drawing, which shows, in part-sectional elevation, apparatus employed for carrying out the method.

Referring to the drawing, a vitreous silica substrate tube 1, supported vertically, has an inlet for gas which may be a side tube 2 adjacent to its upper end, or alternatively (not shown) a tube inserted through a seal at its upper end, and an inner tube 3 of vitreous silica is sealed through a cap 4 closing the upper end of the tube 1, forming an annular space 5 between the tubes 1 and 3. The tube 3 is located coaxially within the substrate tube by means of three silica projections 6 attached to its lower end and abutting against the substrate tube wall, and a short length of closely fitting silica tube 7 with similar projections 8 which is placed over the tube 3 near its upper end. The open upper end 9 of the tube 3 is connected to means (not shown) for supplying the required mixture of carrier gas and reactant vapour or vapours to this tube, the lower end 10 of the tube 3 is closed, and the wall of the tube 3 is pierced by a multiplicity of perforations 11 (shown greatly enlarged) to permit egress of the reactant vapours and carrier gas into the space 5 which constitutes the reaction zone. The lower end of the substrate tube 1 is connected to a vacuum pump (not shown), for exhaustion of the tube as indicated by the arrow.

A microwave cavity 12, formed of an outer cylinder 13 and an inner cylinder 14 of predetermined height, is located adjacent to the gas exit end of the tube 1, the lower end of the tube being inserted through the inner cylinder 14: the cylinder 14 is formed in two portions enabling its height to be adjusted telescopically. Power is supplied to the cavity from a microwave generator 15. A waveguide tube 16 of circular cross-section, formed of high temperature oxidation resistant steel, is also positioned around the substrate tube, extending from the top of the microwave cavity nearly to the gas inlet tube 2, and the tube 16 is surrounded by a tubular electric furnace 17.

In a specific form of the apparatus described above with reference to the drawing, employed for carrying out the process described in the example, the substrate tube 1 has an internal diameter of 16.5 mm and an external diameter of 19 mm, the internal and external diameters of the inner tube 3 are respectively 4 mm and 6 mm, the perforations 11 are 50 microns in diameter: these perforations are conveniently formed by drilling through the tube wall with a laser beam; the tube has 120 perforations distributed over 15 cm of its length. The waveguide tube 16 has an internal diameter of 6.1 cm, and the tubular furnace 17 has an internal diameter of 7.5 cm. The frequency of the power input to the microwave cavity is 2.45 GHz (wavelength $\lambda = 12.2$ cm): the height of the inner cylinder 14 of the cavity is therefore approximately 9.15 cm, that is to say $\frac{3}{4}\lambda$, the optimum value being slightly less than this and being found by tuning, which is effected by adjusting the height telescopically. The outer diameter of the inner cylinder, and the inner diameter of the outer cylinder, of the cavity, are respectively 32 mm and 57 mm: these dimensions are found to make the overall impedance of the cavity/waveguide system match that of the microwave generator and cable, when the system is operated under the conditions described in the following example.

In a specific example of the method of the invention, the apparatus described above with reference to the drawing is employed for the production of a step refractive index preform consisting of an undoped silica cladding layer constituted by the substrate tube 1, and a core of silica doped with germania and phosphorous pentoxide, formed by the deposition of a vitreous coating on the interior surface of the tube wall. Initially a stream of argon alone is passed into the inner tube 3, while oxygen alone is passed into the inlet tube 2 and through the annular space 5, and substantially constant power of 300 watts is supplied to the microwave cavity. When the plasma column 18 has been established in the space 5, and the furnace has heated up to the required temperature to maintain the substrate tube wall at 1000° C., further streams of argon are bubbled through liquid silicon tetrachloride, germanium tetrachloride and phosphorus oxychloride respectively, these streams entraining the chloride vapours are mixed with the main argon stream, and this gaseous mixture is passed into the tube 3, first passing through a capillary tube (not shown) of 0.5 mm bore and one meter long, to control the gas pressure within the tube 3, which is thus maintained at approximately one-fifth of an atmosphere. The flows of the respective gas streams are controlled to give constant flow rates of 380 standard cubic centimeters per minute (sccm) of total argon, 45 sccm of oxygen, 7.8 sccm of silicon tetrachloride, 0.35 sccm of germanium tetrachloride, of 0.5 sccm of phosphorus oxychloride, and the plasma space 5 is evacuated to a constant pressure of approximately one Torr.

Under these conditions of gas flow, pressure, temperature and power supply, employed in the manufacture of a specific preform, continuous deposition of glass composed of silica containing 4.5 mol.% of germania and 0.5 mol.% of phosphorus pentoxide was effected on the substrate tube wall, forming a coating 19 (shown in exaggerated thickness) over approximately 18 cm of the length of the tube, extending from 1 cm below the topmost perforations in the inner tube to 4 cm below the lowest perforations. During continuous operation for 4.6 hours, the weight of glass deposited on the substrate tube was 4.3 grams, some deposition also occurring on the exterior of the inner tube 3.

It should be noted that since the region of the substrate tube in which deposition of a satisfactory vitreous coating occurs is limited by cooling of the end portions of the furnace, the perforations 11 permitting egress of the chloride vapours into the reaction zone 5 are provided only in a part of the wall of the inner tube 3 which corresponds in length and longitudinal position to the region of the substrate tube which can be maintained at the requisite temperature of 1000° C. If deposition on a greater length of substrate tube is required, this can of course be achieved by employing a waveguide tube and furnace of greater length, and increasing the power input to the microwave cavity to extend the plasma column further up the substrate tube.

After completion of the deposition process, the inner tube 3 is withdrawn from the substrate tube, and the coated bore of the latter is collapsed and subsequently drawn to fibre, in known manner. The preform produced in the specific example described above gives one kilometer of fibre of core diameter 50 microns and external diameter 120 microns.

We claim:

1. A method of manufacturing a glass optical fibre preform in which a coating composed essentially of oxide material is formed on the interior surface of a glass substrate tube by causing a chemical reaction to take place between oxygen and the vapour of at least one compound capable of reacting with oxygen to produce the desired coating material, wherein an inner tube which has a multiplicity of perforations through its wall is supported coaxially within the substrate tube, an annular space being provided between the perforated tube and the substrate tube, and a gaseous mixture consisting of oxygen and each said vapour, and optionally an additional carrier gas, is caused to flow into the said annular space, at least each said vapour being introduced into the annular space by being passed into the inner tube so as to emerge through the perforations into said space, the gas pressure in the inner tube being maintained higher than that in the said annular space so as to cause gas to flow through the perforations into said annular space, while at least a major part of the length of the substrate tube is maintained at an elevated temperature, and a chemical reaction is caused to take place throughout the said annular space by generating energy in said space, whereby a coating of solid material resulting from the said reaction is formed simultaneously on the whole of the interior surface of the heated length of the substrate tube, while residual gases and gaseous reaction products are withdrawn from said annular space, the perforations in the said perforated inner tube being varied in respect of at least one of the features consisting of diameter, number and distribution along the length of the tube as required to control the rates of gas flow through the perforations and deposition of the coating so that the coating formed on the interior surface of the substrate tube is of uniform thickness both radially and longitudinally.

2. A method according to claim 1, wherein each said reactant vapour, entrained in a carrier gas, is passed into the inner perforated tube, and the oxygen is passed into the said annular space between the inner and 3. A method according to claim 1, wherein the energy for activating the coating-forming reaction is generated in said annular space by a plasma-exciting device, operated in such a manner as to produce a plasma column in the gaseous mixture in the said annular space and to maintain the column throughout substantially the whole length of said space.

4. A method according to claim 1, wherein the energy for activating the coating-forming reaction is generated in said annular space by a plasma-exciting device which is maintained in a stationary position with respect to the assembly of substrate tube and perforated tube, and is operated in such a manner as to produce a plasma column in the gaseous mixture in the said annular space, and to maintain the column throughout substantialy the whole length of said space.

5. A method according to claim 1, wherein the energy for activating the coating-forming reaction is derived from a plasma generated in said annular space by an asymmetrical microwave cavity which is located in a stationary position around one end of the substrate tube, and is so designed and located that, in operation, the plasma column produced extends wholly along the said annular space.

6. A method according to claim 5, wherein the substrate tube is surrounded by an electrically conductive tube abutting the microwave cavity, the arrangement of the microwave cavity and the conductive tube being such that the combination of the conductive tube and the plasma column produced in operation constitutes a coaxial waveguide.

* * * * *